(12) United States Patent
Shiina et al.

(10) Patent No.: US 7,377,875 B2
(45) Date of Patent: May 27, 2008

(54) PLANETARY GEAR APPARATUS AND STEERING APPARATUS WITH PLANETARY GEAR APPARATUS

(75) Inventors: Akihiko Shiina, Kashihara (JP); Hiroaki Sougumo, Yamatokoriyama (JP); Shiro Nakano, Osaka (JP); Kosuke Yamanaka, Kashiwara (JP)

(73) Assignee: JTekt Corporation, Osaka (JP)

( * ) Notice: Subject to any disclaimer, the term of this patent is extended or adjusted under 35 U.S.C. 154(b) by 63 days.

(21) Appl. No.: 11/311,163

(22) Filed: Dec. 20, 2005

(65) Prior Publication Data

US 2006/0135312 A1 Jun. 22, 2006

(30) Foreign Application Priority Data

Dec. 21, 2004 (JP) ............................. 2004-370215

(51) Int. Cl.
*F16H 57/08* (2006.01)
(52) U.S. Cl. ...................................... 475/339; 475/331
(58) Field of Classification Search .................... None
See application file for complete search history.

(56) References Cited

U.S. PATENT DOCUMENTS 4,294,132 A * 10/1981 Matusz ......................... 74/462
5,588,328 A * 12/1996 Nihei et al. ................... 74/409
6,527,671 B2 * 3/2003 Paalasmaa et al. ........... 477/99

FOREIGN PATENT DOCUMENTS

| JP | 6-257660 A | 9/1994 |
|----|------------|--------|
| JP | 9-210143 A | 8/1997 |
| JP | 10-141476 A | 5/1998 |

* cited by examiner

*Primary Examiner*—Roger Pang
*Assistant Examiner*—Derek D. Knight
(74) *Attorney, Agent, or Firm*—Birch, Stewart, Kolasch & Birch, LLP

(57) ABSTRACT

A planetary gear apparatus whose gears are all constituted by continuous shifted gears. A backlash between the input sun gear and each of the input side planetary gears is adjusted by pressing a second carrier plate supporting each integrated pair of the input side planetary gears and the output side planetary gears and moving it in the axial length direction by a ball bearing by a screwing operation of an adjusting nut. A backlash between the output sun gear and each of the output side planetary gears is also adjusted by pressing the output sun gear and moving it in the axial length direction by the ball bearing by the screwing operation of the adjusting nut. Accordingly, the backlash of all meshing portions can be adjusted during or after completion of the assemblage.

5 Claims, 4 Drawing Sheets

PLANETARY GEAR APPARATUS AND STEERING APPARATUS WITH PLANETARY GEAR APPARATUS

CROSS-REFERENCE TO RELATED APPLICATIONS

This Nonprovisional application claims priority under 35 U.S.C. §119(a) on Patent Application No. 2004-370215 filed in Japan on Dec. 21, 2004, the entire contents of which are hereby incorporated by reference.

BACKGROUND OF THE INVENTION

1. Field of the Invention

The present invention relates to a planetary gear apparatus capable of transferring rotation from an input side to an output side while changing gear ratio in stepless manner from the deceleration range to the acceleration range, and especially to a planetary gear apparatus that is used as a variable gear ratio transmission mechanism for changing the correspondence between operation quantity of a steering member and operation quantity of a steering mechanism, for example in a steering apparatus of a vehicle.

2. Description of Related Art

A vehicle is steered by transferring the operation of a steering member such as a steering wheel to a steering mechanism via a steering shaft and by changing the direction of steerring control wheels (in general, right and left wheels) by the operation of the steering mechanism. In such steering of the vehicle, a good steering feel can be obtained by changing the correspondence between the operation quantity of the steering member and the operation quantity of the steering mechanism according to the travel state of the vehicle such as the level of vehicle speed, the amount of steering angle.

For example, by making larger the operation quantity of the steering mechanism than that of the steering member at a low speed travel or middle speed travel, the driving operation can be easier as the steered angle of the wheel gets larger. In contrast, at a high speed travel, by making smaller the operation quantity of the steering mechanism than that of the steering member, the stability is heightened as the steered angle of the steerring control wheel gets smaller since the operation quantity of the steering mechanism is smaller even in a quick operation.

Conventionally, because of above-mentioned circumstances, a steering apparatus was developed such that the rotation transfer from the operation member side (input side) to the steering mechanism side (output side) is performed by changing the gear ratio by interposing a variable gear ratio transmission mechanism in the middle of a steering shaft connecting the steering member and the steering mechanism. It is preferable that a variable gear ratio transmission mechanism could change the gear ratio in stepless manner from the deceleration range to the acceleration range and be constituted compactly. As means for responding to these requests, a variable gear ratio transmission mechanism using a planetary gear apparatus has been put to practice use (for example, see 'Nikkei Mechanical', No. 585, pp. 24-25, Jun. 1st, 2003).

The conventional planetary gear apparatus as described above comprises an input sun gear and an output sun gear, which are supported coaxially, and a plurality of input side planetary gears and a plurality of output side planetary gears, which are respectively meshed with the outer peripheries of the input and output sun gears and supported on a common carrier. The apparatus further comprises a speed change motor applying rotation power to the carrier in both forward and reverse directions.

By constituting the conventional planetary gear apparatus in such a manner, the rotation of the input sun gear is transferred to the output sun gear together with the rotation of the input side planetary gears and the output side planetary gears when the carrier is fixed by maintaining the speed change motor in a non-rotation state. Accordingly, the output sun gear rotates at the same speed as the input sun gear, causing the same speed transmission state with the gear ratio of 1.

In contrast, when the carrier is rotated in the same direction as that of the input sun gear by rotating and driving the speed change motor, the rotation of the input sun gear is transferred to the output sun gear together with the rotation of the input side planetary gears and the output side planetary gears, which revolve with the carrier. Accordingly, the output sun gear rotates at the rotation speed of the carrier, that is, the rotation speed added with the revolution speed of the input side planetary gears and the output side planetary gears, causing an increased speed transmission state with the gear ratio larger than 1. On the other hand, when the carrier is counter-rotated by rotating and driving the speed change motor, the output sun gear rotates at the rotation speed decreased by the rotation speed of the carrier from that of the input sun gear, causing a decreased speed transmission state with the gear ratio smaller than 1.

By interposing the conventional planetary gear apparatus as described above in the middle of a steering shaft, connecting the input sun gear to a steering member, and connecting the output sun gear to a steering mechanism, the planetary gear apparatus can be used as a variable gear ratio transmission mechanism as described above and correspond to the change control of steering property according to the travel state of a vehicle. In the planetary gear apparatus as described above, when the speed change motor is driven and rotated without rotation of the input sun gear, the steering mechanism can be operated without the operation of the steering member since the output sun gear meshing with the output side planetary gears revolving with the carrier rotates. This means that corrective steering for correcting an attitude change of a vehicle caused by disturbance such as cross wind, slipping, etc. be also possible.

The conventional planetary gear apparatus as described above is a useful, excellent device as a variable gear ratio transmission mechanism in a steering apparatus of a vehicle since the gear ratio can be varied in stepless manner from the deceleration range to the acceleration range. In an actual use of such a variable gear ratio transmission mechanism, however, the rotation direction is frequently switched for conversion of steering in both right and left directions. As a result, when switching the rotation direction, this apparatus has a problem that unusual sounds might be generated at a meshing portion between the input sun gear and the input side planetary gears and that between the output sun gear and the output side planetary gears.

Such unusual sounds are collision sounds caused by that the teeth of each gear relatively move within a backlash range and collide with each other when switching the rotation direction, and can be eliminated by constituting so as not to generate backlash at each meshing portion. However, the apparatus has a problem that the number of machining and assembling man-hours might be increased since a high level of machining accuracy is required to the input sun gear, the output sun gear, the tooth surfaces of the input side planetary gears and the output side planetary gears, as well as support portions of theses gears for assembling the apparatus in such a manner.

BRIEF SUMMARY OF THE INVENTION

The present invention is made by taking above-mentioned circumstances into consideration and its object is to provide a planetary gear apparatus capable of restraining generation of unusual sounds by collision of gear teeth to each other caused by abrasion of the teeth, etc. by aged deterioration, etc. enabling quiet operations without increasing the number of machining and assembling man-hours by enabling adjustment of the backlash of a meshing portion between an input sun gear and input side planetary gears and that of a meshing portion between an output sun gear and output side planetary gears during assemblage or after completion of the assemblage.

A first aspect of a planetary gear apparatus according to the present invention is a planetary gear apparatus which comprises an input sun gear and an output sun gear supported coaxially; a plurality of integrated pairs of an input side planetary gear meshing with an outer periphery of the input sun gear and an output side planetary gear meshing with an outer periphery of the output sun gear; and a carrier supporting a plurality of spindles commonly and pivotably supporting each integrated pair of the input side planetary gear and the output side planetary gear, and transfers rotation of the input sun gear to the output sun gear while changing gear ratio in stepless manner by rotating the carrier in both forward and reverse directions, and is characterized in that the input sun gear, the output sun gear, each of the input side planetary gears and each of the output side planetary gears are all constituted by continuous shifted gears which change an amount of addendum modification continuously in the axial length direction, and a backlash adjusting device for adjusting backlash between each of the gears by moving each of the gears from one side in the axial length direction to the other side direction is provided.

A second aspect of a planetary gear apparatus according to the present invention, as in the first aspect, is characterized in that the backlash adjusting device includes: a first adjusting device for adjusting a backlash between the input side planetary gear and the input sun gear, or a backlash between each of the output side planetary gears and the output sun gear by pressing the carrier from one side in the axial length direction to another side and moving each of the input side planetary gears or each of the output side planetary gears; and a second adjusting device for adjusting a backlash between the output sun gear and each of the output side planetary gears, or a backlash between the input sun gear and each of the input side planetary gears by pressing the output sun gear or the input sun gear from one side in the axial length direction to another side and moving it.

A third aspect of a planetary gear apparatus according to the present invention, as in the second aspect, is characterized in that the first adjusting device is provided so as to be operated from outside of a housing for supporting the input sun gear and the output sun gear.

A fourth aspect of a planetary gear apparatus according to the present invention, as in the first aspect, is characterized in that each of the integrated pairs of the input side planetary gears and the output side planetary gears is supported to the carrier in a manner permitting an integral movement in the axial length direction, and the backlash adjusting device is constituted so as to collectively adjust the backlash between the output sun gear and each of the output side planetary gears and that between the input sun gear and each of the input side planetary gears by pressing the output sun gear in the axial length direction and moving it closely to the input sun gear, or by pressing the input sun gear in the axial length direction and moving it closely to the output sun gear.

In the first aspect of the planetary gear apparatus according to the present invention as described above, since continuous shifted gears are used as for an input sun gear and an output sun gear, and input side planetary gears and output side planetary gears, and the apparatus comprises a backlash adjusting device for relatively moving these gears in the axial length direction, the backlash adjustment between each gear can be easily performed during assemblage step, and a variable gear ratio transmission mechanism can be constituted such that generation of unusual sounds by collision of gear teeth to each other at the time of rotation transfer in both the forward and reverse directions can be restrained to enable quiet operations.

In the second aspect of the planetary gear apparatus according to the present invention, since a carrier supporting the input side planetary gears and the output side planetary gears are constituted so as to move from one side in the axial length direction to the other side by the first adjusting device while the output sun gear and the input sun gear are constituted so as to move from one side in the axial length direction to the other side by the second adjusting device, the backlash adjustment can be easily performed by operating these adjusting devices from the same side.

In the third aspect of the planetary gear apparatus according to the present invention, since the first adjusting device can be operated from outside of the housing, the operation of the first adjusting device is not obstructed by existence of the second adjusting device, and accordingly, the backlash adjustment can be collectively performed after the completion of assemblage.

In the fourth aspect of the planetary gear apparatus according to the present invention, since the input side planetary gears and the output side planetary gears are supported so as to move in the axial length direction, the backlash between each gear can be collectively adjusted by an adjusting device for moving any one of the output sun gear and the input sun gear to the other one.

The above and further objects and features of the invention will more fully be apparent from the following detailed description with accompanying drawings.

DETAILED DESCRIPTION OF THE PRESENT INVENTION

Figure 1:
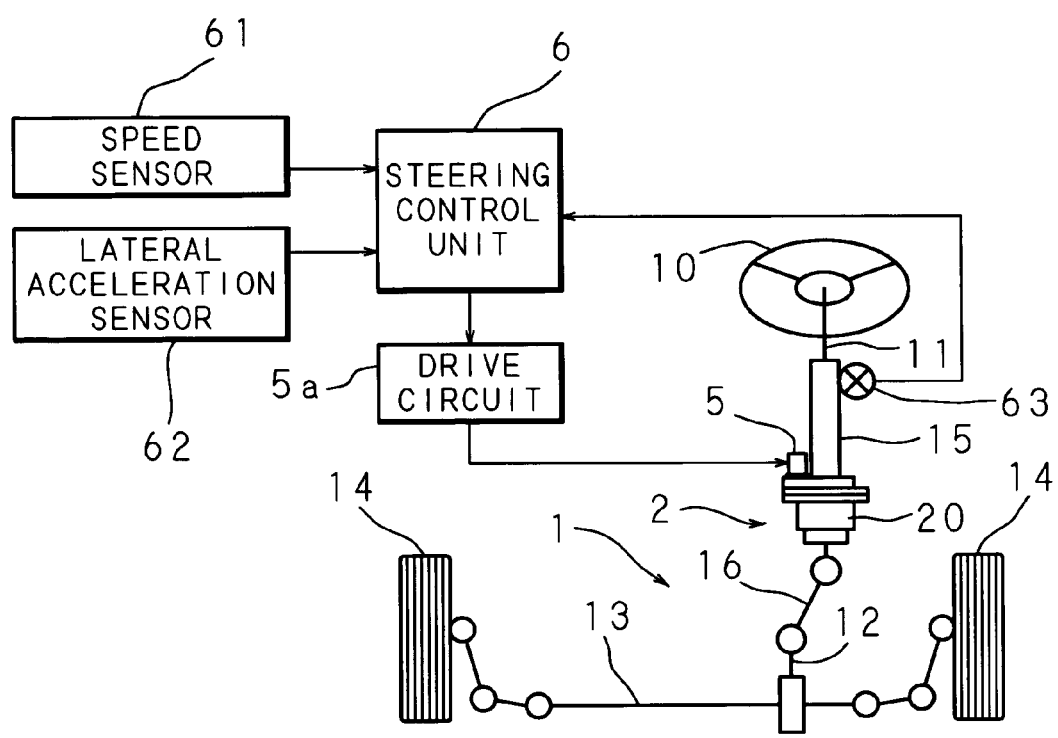
FIG. 1 is a schematic diagram showing an example of applying a planetary gear apparatus according to the present invention to a steering apparatus of a vehicle.

In the following, the present invention is described in detail based on drawings showing embodiments according to the present invention. FIG. 1 is a schematic diagram showing an example of applying a planetary gear apparatus according to the present invention to a steering apparatus of a vehicle.

A steering apparatus 1 shown in FIG. 1 is a so-called rack-and-pinion type steering apparatus. To be more concrete, the rotation operation of a steering wheel 10 as a steering member is transferred to a pinion shaft 12 via a steering shaft 11, the rotation of the pinion shaft 12 is converted into a movement in the axial length direction of a rack shaft 13 extended laterally on a vehicle, which is not shown in the drawings, the movement in the axial length direction of the rack shaft 13 is transferred to right and left steering control wheels 14, 14, and thus steering is performed.

The steering shaft 11 is rotatably supported to a column housing 15. Inside the column housing 15, the steering shaft 11 is divided into two shafts: an upper shaft 11a and a lower shaft 11b (see FIG. 2, FIG. 3, and FIG. 4). The projecting end of the steering shaft 11 (upper shaft 11a) upward to the column housing 15 is connected to the steering wheel 10, and similarly, the projecting end of the steering shaft 11 (lower shaft 11b) downward to the same is connected to the pinion shaft 12 via a middle shaft 16.

The planetary gear apparatus 2 according to the present invention is constituted inside a gear housing 20 formed by enlarging the diameter of the lower portion of the column housing 15 as described later. The planetary gear apparatus 2 functions as a variable gear ratio transmission mechanism for transferring the rotation from the upper shaft 11a as an input shaft to the lower shaft 11b as an output shaft in stepless manner from the deceleration range to the acceleration range while changing the gear ratio.

A speed change motor 5 as an actuator for changing the gear ratio is fixed on outside of the gear housing 20. The speed change motor 5 is driven and rotated in both the forward and reverse directions in response to the operation commands given from a steering control unit 6 consisting of a microprocessor to a drive circuit 5a. The gear ratio is varied according to the operations of the planetary gear apparatus 2 according to the rotation of the speed change motor 5, as described later.

Detection results of various kinds of information indicating the travel state of a vehicle which might impact steering, are provided to the steering control unit 6 from sensors arranged on various portions of the vehicle, such as a speed sensor 61 detecting the travel speed of the vehicle, a lateral acceleration sensor 62 detecting the lateral acceleration applied to the vehicle body, a steering angle sensor 63 detecting the rotational angle of the steering shaft 11 by the operation of the steering wheel 10, etc.

Figure 2:
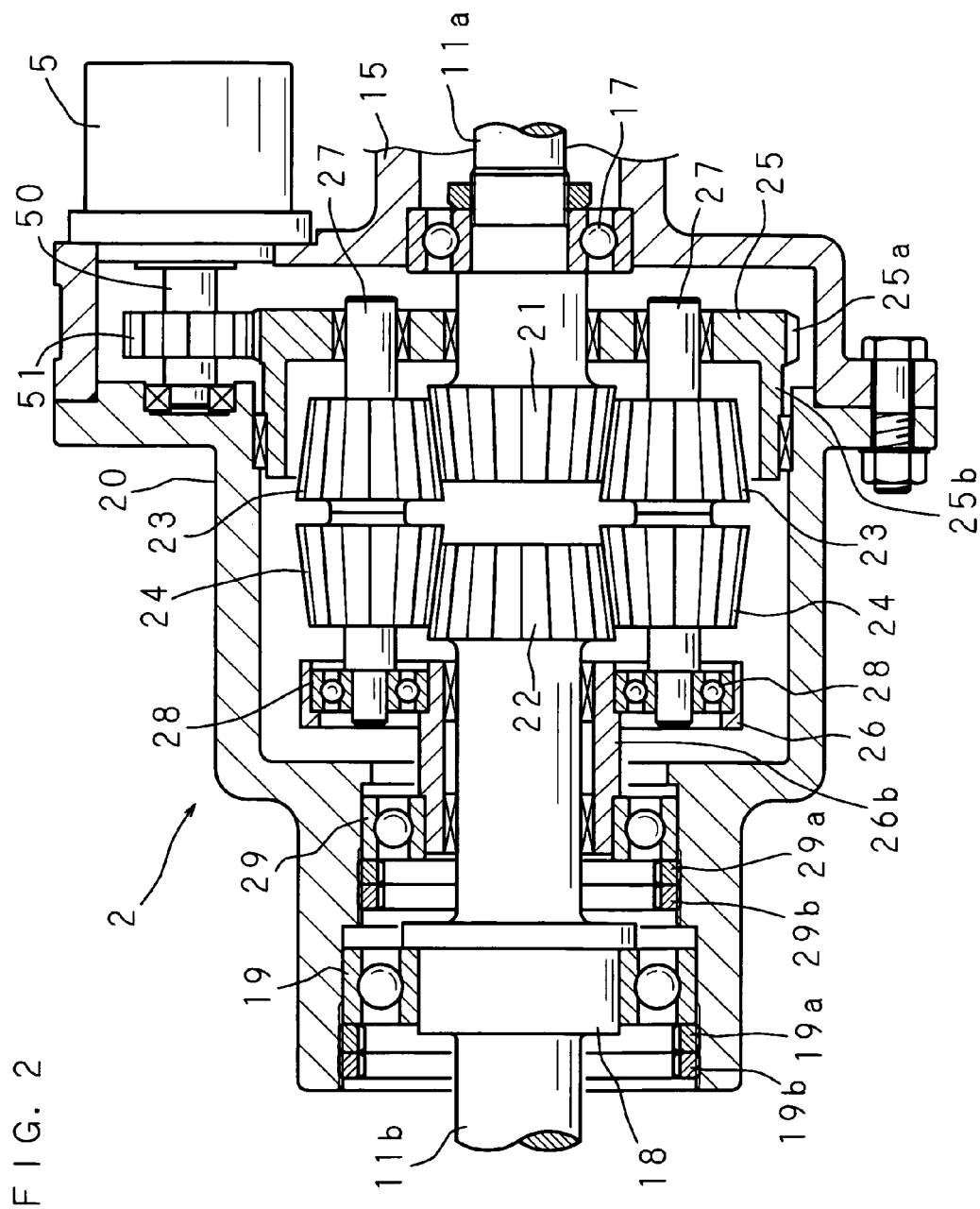
FIG. 2 is a longitudinal sectional view showing a first embodiment of a planetary gear apparatus according to the present invention.

FIG. 2 is a longitudinal sectional view showing a first embodiment of a planetary gear apparatus 2 according to the present invention. As shown in FIG. 2, the upper shaft 11a and the lower shaft 11b of the steering shaft 11 have coaxially opposing front ends inside the gear housing 20. An input sun gear 21 and an output sun gear 22 are respectively formed on the opposite end portions of the upper shaft 11a and the lower shaft 11b coaxially as the upper shaft 11a and the lower shaft 11b.

A plurality of input side planetary gears 23 is meshed with the tooth portion on the outer periphery of the input sun gear 21. The same number of output side planetary gears 24 as that of input side planetary gears 23 are meshed with the tooth portion on the outer periphery of the output sun gear 22. A pair of input side planetary gear 23 and the output side planetary gear 24 is integrated and rotatably pivoted between a first carrier plate 25 coaxially, relatively rotatably, supportedly fitted to the middle of the upper shaft 11a and a second carrier plate 26 similarly supportedly fitted to the middle of the lower shaft 11b in a manner enabling integral rotation by a common spindle 27 fitted in parallel with the upper shaft 11a and the lower shaft 11b. The first carrier plate 25 and the second carrier plate 26 form a carrier. Accordingly, the same number of spindles 27 is provided as that of the input side planetary gears 23 or the output side planetary gears 24. The first and second carrier plates 25, 26 are integrally connected by a connecting member (not shown in the drawings) spanned at places in the peripheral direction not interfering with the input side planetary gears 23 and the output side planetary gears 24.

The first carrier plate 25 comprises external teeth 25a formed entirely on the outer peripheral surface. The speed change motor 5 is fixed and supported to a fixing stand mounted on outside of the gear housing 20. The speed change motor 5 has an output shaft 50 extended inside the gear housing 20 in parallel with the upper shaft 11a and the lower shaft 11b at the place outside the first carrier plate 25. A spur gear 51 is coaxially fitted and fixed to the middle of the output shaft 50 so as to mesh with the external teeth 25a on the outer periphery of the first carrier plate 25.

In the first embodiment of a planetary gear apparatus 2 constructed in such a manner according to the present invention, when the speed change motor 5 is driven and rotated, the rotation is transferred to the first carrier plate 25 via the spur gear 51, and accordingly, the first carrier plate 25 rotates together with the second carrier plate 26 integrally connected to the first carrier plate 25. As a result, each integrated pair of the input side planetary gear 23 and the output side planetary gear 24, which is supported on the first and second carrier plates 25, 26 integrally rotates around the respective spindles 27 at the respective places on the revolution periphery while revolving around the upper shaft 11a and the lower shaft 11b, which supportedly fit the first and second carrier plates 25, 26.

The first carrier plate 25 is supported on the gear housing 20 via a support cylinder 25b coaxially projected to one side of its outer peripheral portion, and the second carrier plate 26 is supported to the gear housing 20 via a support cylinder 26b coaxially projected to one side of its inner peripheral portion, as described later. The first and second carrier plates 25, 26 are supported by the gear housing 20 on both the outer and inner sides of these plates, and thereby, the first and second carrier plates 25, 26 stably rotate with the transmission from the speed change motor 5.

The input sun gear 21 and the output sun gear 22 have an outer peripheral surface with a larger tapered diameter from the respective opposing side to the other side, and are constituted as continuous shifted gears of which the teeth formed on the respective outer peripheral surfaces are gearcut with continuously changing the amount of addendum modification from one side in the axial length direction to the other side. Each of the input sun gears 23 and each of the output sun gears 24 have an outer peripheral surface with a larger tapered diameter from the butt side of the gears to the other side, and are constituted as continuous shifted gears of which the teeth formed on the respective outer peripheral surfaces are gearcut with continuously changing the amount of addendum modification from one side in the axial length direction to the other side.

As described above, the input sun gear 21 and each of the input side planetary gears 23, which are constituted as continuous shifted gears, have identical inclination for each outer peripheral surface and identical change state of the amount of addendum modification determined according to the inclination. Thus, as shown in FIG. 2, the input sun gear 21 and each of the input side planetary gears 23 can be meshed in a state where respective center shafts are supported in parallel with each other, and the increase and decrease of the backlash at the meshing portion of these gears can be adjusted by relatively moving these gears in the axial length direction in such a state. Quite similarly, the output sun gear 22 and each of the output side planetary gears 24 can be meshed in a state as shown in FIG. 2, and the increase and decrease of the backlash at the meshing portion of these gears can be adjusted by relatively moving these gears in the axial length direction.

The input sun gear 21 is constrained in a state where an upward movement (right in FIG. 2) is prohibited by a ball bearing 17 for bearing the input sun gear 21 at the middle of the upper shaft 11a inside the column housing 15. Each integrated pair of the input side planetary gear 23 and the output side planetary gear 24 is constrained to the second carrier plate 26 by ball bearings 28 respectively bearing the respective pairs of common spindles 27 in a state where a downward movement (left in FIG. 2) with respect to the second carrier plate 26 is prohibited. The second carrier plate 26 has a support cylinder 26b projecting onto its one side, and the support cylinder 26b is born by a ball bearing 29. The second carrier plate 26 is constrained in a state where a downward movement with respect to the gear housing 20 is prohibited by the ball bearing 29 as described later.

One end of an annular adjusting nut 29a threadedly meshed with a screw portion threaded on the inner periphery of the gear housing 20 is abutted from the lower side against the lower side (left in FIG. 2) of an outer ring of the ball bearing 29 bearing the second carrier plate 26. An annular lock nut 29b threadedly meshed with a screw portion threaded on the inner periphery of the gear housing 20 described above is abutted against another side of the adjusting nut 29a. Thus, the ball bearing 29 is moved upward by the screwing operation of the adjusting nut 29a and it is fixed and positioned in a state where a downward movement is prohibited by clamping the lock nut 29b at an appropriate position.

On the other hand, the output sun gear 22 is constrained in a state where a downward movement in the vicinity of a lower end opening portion of the gear housing 20 is prohibited by the ball bearing 19 for bearing a journal 18 having a large diameter provided to the middle of the lower shaft 11b. One side of an annular adjusting nut 19a threadedly meshed with the screw portion threaded on the inner periphery of the gear housing 20 is abutted from the lower side against the outer ring of the ball bearing 19. An annular lock nut 19b threadedly meshed with the screw portion threaded on the inner periphery of the gear housing 20 described above is abutted against another side of the adjusting nut 19a. Thus, the ball bearing 19 is moved upward by the screwing operation of the adjusting nut 19a and it is positioned and fixed in a state where a downward movement is prohibited by clamping the lock nut 19b at an appropriate position.

In the planetary gear apparatus 2 shown in FIG. 2 having a support structure to the gear housing 20 as described above, by screwing the adjusting nut 29a and moving the ball bearing 29, the second carrier plate 26 born by the ball bearing 29 as described above moves upward, and the input side planetary gears 23 and the output side planetary gears 24, which are born by the ball bearing 28 to the carrier plate 26, also move. As a result, since the input side planetary gears 23 relatively move with respect to the input sun gear 21 which is prohibited to move upward, the backlash at a meshing portion between both the gears can be appropriately adjusted as described above. The backlash realized by this adjustment is maintained by clamping of the lock nut 29b.

Quite similarly, by screwing the adjusting nut 19a and moving the ball bearing 19, the output sun gear 22 born as described above by the ball bearing 19 moves upward. As a result, since the output sun gear 22 relatively moves with respect to the output side planetary gears 24, the backlash at a meshing portion between both the gears can be appropriately adjusted as described above. The backlash obtained by this adjustment is maintained by clamping of the lock nut 19b.

In the planetary gear apparatus 2 shown in FIG. 2, the backlash at the meshing portion between the input sun gear 21 and the input side planetary gears 23 can be adjusted by the screwing operation of the adjusting nut 29b. And screwing the adjusting nut 19a after that, the backlash at the meshing portion between the output sun gear 22 and the output side planetary gears 24 can be also adjusted, and accordingly, an ideal meshing state where each gear meshes with each other substantially without backlash can be securely realized. The screwing operation of the adjusting nut 19a and the clamping operation of the lock nut 19b can be easily done using an appropriate tool through the opening portion at the lower end portion of the gear housing 20. The clamping operations of the adjusting nut 29a and the lock nut 29b can be similarly done through the opening portion at the lower end portion of the gear housing 20 before assembling of the ball bearing 19.

In the steering apparatus shown in FIG. 1 comprising the planetary gear apparatus 2 constructed in such a manner, when a steering wheel 10 is rotated for steering, the upper shaft 11a connected to the steering wheel 10 rotates and the input sun gear 21 of the planetary gear apparatus 2 also rotates.

When the speed change motor 5 is not driven and rotated and the first carrier plate 25 is constrained in a non-rotation state, by the rotation of the input sun gear 21, each of the input side planetary gears 23 meshed with the input sun gear 21 rotates around the respective spindle 27. Thus, each of the output side planetary gears 24 using each spindle 27 as a common spindle rotates, and a rotation forth is applied to the output sun gear 22 meshed with the output side planetary gears 24, and accordingly, the lower shaft 11b to which the output sun gear 22 is fixed also rotates. The rotation of the lower shaft 11b is converted into a movement in the axial length direction of a rack shaft 13 meshed with a pinion shaft 12, and the movement is transferred to right and left steering control wheels 14, 14.

At that time, since transferring of the rotation from the upper shaft 11a to which the input sun gear 21 is fixed to the lower shaft 11b to which the output sun gear 22 is fixed is the same speed transmission with the gear ratio of 1, the steering control wheels 14, 14 are steered for an angle corresponding to the operation direction and operation quantity of the steering wheel 10.

In contrast, when the speed change motor 5 is driven and rotated and the first carrier plate 25 is rotated in the same direction as the input sun gear 21, the rotation of the input sun gear 21 is transferred to the output sun gear 22 together with each integrated pair of the rotation of the input side planetary gear 23 and the output side planetary gear 24, which revolve with the first carrier plate 25. As a result, the output sun gear 22 rotates at the speed increased by the revolution speed by the rotation of the first carrier plate 25 than the input sun gear 21. At that time, since transferring of the rotation from the upper shaft 11*a* to the lower shaft 11*b* becomes an increased speed transmission with the gear ratio larger than 1, the steering control wheels 14, 14 are steered larger than the operation quantity of the steering wheel 10.

On the other hand, when the speed change motor 5 is driven and rotated and the first carrier plate 25 is rotated in the reverse direction with respect to the input sun gear 21, the output sun gear 22 rotates at the speed decreased by the revolution speed by the rotation of the first carrier plate 25 than the input sun gear 21. At that time, since transferring of the rotation from the upper shaft 11*a* to the lower shaft 11*b* becomes a decreased speed transmission with the gear ratio smaller than 1, the steering control wheels 14, 14 are steered smaller than the steering quantity of the steering wheel 10.

The speed change motor 5 is, as described above, driven in both the forward and reverse directions according to a control command given from a steering control unit 6 based on the detection result of the travel state of a vehicle given from the speed sensor 61, the lateral acceleration sensor 62, the steering angel sensor 63, etc.

The steering control unit 6 is constituted so as to generate a control command to drive and rotate the speed change motor 5 in the same direction as the operation direction of the steering wheel 10 when the vehicle speed detected by the speed sensor 61 is low or middle, and on the contrary to drive and rotate the speed change motor 5 in the reverse direction of the operation direction of the steering wheel 10 when the vehicle speed is high. Thus, since the steering angle of the steering control wheels 14, 14 is larger than the operation quantity of the steering wheel 10 during low speed or middle speed travel, the driving operation would be easier. During a high speed travel, since the steering angle of the steering control wheels 14, 14 is smaller than the operation quantity of the steering wheel 10, an unstable behavior of the vehicle due to quick steering can be prevented and travel stability would be increased.

The lateral acceleration sensor 62 detects lateral acceleration of the vehicle. When the detected lateral acceleration is excessively large, the steering control unit 6 drives and rotates the speed change motor 5 in the reverse direction to the operation direction of the steering wheel 10 and the steering angle of the steering control wheels 14, 14 is made smaller. Thus, slipping or spinning of the vehicle can be prevented. The steering angle sensor 63 detects the rotational angle when the steering wheel 10 is operated, that is, the steering angle. When the steering angle detected by the steering angle sensor 63 is small, the steering control unit 6 drives and rotates the speed change motor 5 in the reverse direction to the operation direction of the steering wheel 10 and the steering angle of the steering control wheels 14, 14 is made smaller. Thus, the straight line stability of the vehicle can be increased. When the detected steering angle is large, the steering control unit 6 drives and rotates the speed change motor 5 in the same direction as the operation direction of the steering wheel 10 and the steering angle of the steering control wheels 14, 14 is made larger. Thus, the driving operation would be easier.

In addition, the steering control unit 6 also controls the rotation speed as well as the rotation direction of the speed change motor 5, and it controls so as to realize an appropriate gear ratio corresponding to the travel state of the vehicle by continuously changing the gear ratio. When the speed change motor 5 is driven and rotated in a state where the input sun gear 21 is not rotated, each of the input side planetary gears 23 meshed with the not-rotated input side sun gear 21 rotates since each integrated pair of input side planetary gears 23 and the output side planetary gears 24 revolve together with the first carrier plate 25. As a result, the output sun gear 22 meshed with each of the output side planetary gears 24 rotating together with each of the input side planetary gears 23 also rotates. Accordingly, in this case, the steering control wheels 14, 14 are steered without the operation of the steering wheel 10. Thus, the corrective steering for automatically correcting an attitude change of a vehicle caused by disturbance such as cross wind, slipping, etc. would be possible.

In the planetary gear apparatus 2 according to the present invention, by the backlash adjustment as done above, the meshing portion between the input sun gear 21 and each of the input side planetary gears 23, and that between the output sun gear 22 and each of the output side planetary gears 24 can be meshed substantially without backlash. Accordingly, since the possibility of generation of unusual sounds caused by collision of teeth at the meshing portion of each gear when changing the operation direction of the steering wheel 10 is almost none, a good steering feel can be realized and the durability of each gear can be increased.

The backlash adjustment, as described above, can be easily done from one side end portion in the axial length direction in an assembled state, and the tooth surfaces and their bearing portions of the input sun gear 21, the output sun gear 22, each of the input side planetary gears 23 and each of the output side planetary gears 24 do not require high machining accuracy, thus reducing the machining and assembling man-hours.

Figure 3:
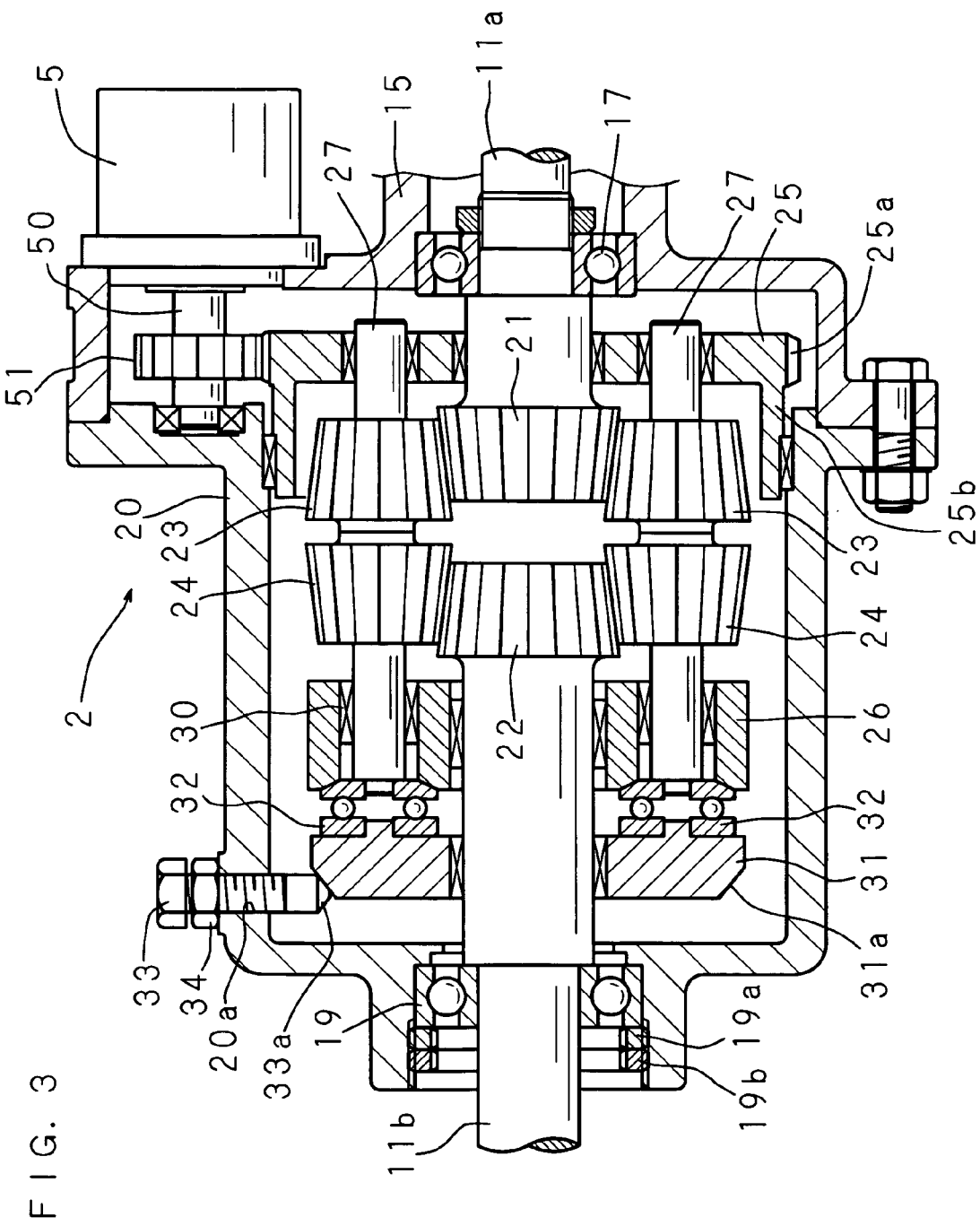
FIG. 3 is a longitudinal sectional view showing a second embodiment of a planetary gear apparatus according to the present invention.

FIG. 3 is a longitudinal sectional view showing a second embodiment of a planetary gear apparatus 2 according to the present invention. The second embodiment shown in FIG. 3 presents a similar structure as the first embodiment shown in FIG. 2 except for the support structure of the second carrier plate 26 and the bearing structure of each spindle 27 to the second carrier plate 26 as described later. Accordingly, in FIG. 3, the component members corresponding to the first embodiment are provided with the same reference numerals as in FIG. 2 and the description is omitted.

In the planetary gear apparatus 2 shown in FIG. 3, the second carrier plate 26 is supportedly fitted to a lower shaft 11*b* in a manner to move in the axial length direction. Each spindle 27 of each integrated pair of an input side planetary gear 23 and an output side planetary gear 24 is born to the second carrier plate 26 enabling a relative movement in the axial length direction of each spindle 27 with respect to the second carrier plate 26, for example, by a bearing 30 such as a needle roller bearing, a slide bearing.

A push plate 31 is supportedly fitted to a lower shaft 11*b* enabling a movement in the axial length direction so as to oppose to the lower side (left in FIG. 3) of the second carrier plate 26. Corresponding to each spindle 27, ball thrust bearings 32 are interposed, respectively, to an opposing gap between one side end surface (end surface opposing to the second carrier plate 26) of the push plate 31 and the end portions of the second carrier plate 26 and each spindle 27. By these ball thrust bearing 32, the downward movements (left in FIG. 3) of the second carrier plate 26 and each spindle 27 are constrained. A push face 31*a* formed as an inclined surface with a reduced tapered diameter toward the end face is peripherally provided to the outer periphery of the other end face (lower side end face; which is left in FIG. 3) of the push plate 31.

On the other hand, a screw hole 20*a* penetrating in the radial direction of a gear housing 20 at the portion corresponding to the above-mentioned push face 31*a* of the push plate 31 positioning inside the gear housing 20 is bored on the peripheral wall of the gear housing 20. An adjusting bolt 33 is threadedly meshed into the screw hole 20a, and the front end portion is projected inside the gear housing 20. A tapered face 33a with a reduced tapered diameter toward the end face is formed on the front end portion of the adjusting bolt 33 projecting inside the gear housing 20. The tapered face 33a abuts against the push face 31a formed on the outer periphery of the end portion of the push plate 31.

In a planetary gear apparatus 2 structured in such a manner, an upward pressing force (right in FIG. 3; and to be more concrete, to a steering member side) can be applied to the push face 31a of the push plate 31 abutting against the tapered face 33a formed on the front end portion of the adjusting bolt 33 by enlarging the projecting length of the adjusting bolt 33 inside the gear housing 20 by the screwing operation. By applying an upward pressing force to the push face 31a, the push plate 31 moves upward (to the steering member side). By the movement of the push plate 31, the second carrier plate 26 and each spindle 27, which are born to the push plate 31 by each ball thrust bearing 32, also move upward, and each integrated pair of input side planetary gear 23 and the output side planetary gear 24 also moves upward. However, since the input sun gear 21 cannot move upward, each of the input side planetary gears 23 relatively moves for the not moving input sun gear 21, and as a result, the backlash at the meshing portion between both the gears is adjusted. The backlash between each of the input side planetary gears 23 and the input sun gear 21, which is realized by adjusting in such a manner, is maintained by a lock nut 34 threadedly meshed with the middle of the adjusting bolt 33 being clamped to the outer surface of the gear housing 20.

On the other hand, the backlash between each of the output side planetary gears 24 and the output sun gear 22 is adjusted by clamping a ball bearing 19 bearing the lower shaft 11a by an adjusting nut 19a, as similar as in the first embodiment shown in FIG. 2, and the adjustment state is maintained by positioning the adjusting nut 19a by clamping a lock nut 19b.

As described above, in the planetary gear apparatus 2 shown in FIG. 3, the backlash at the meshing portion between the input sun gear 21 and each of the input side planetary gears 23 is adjusted by the screwing operation of the adjusting bolt 33, and the backlash at the meshing portion between the output sun gear 22 and each of the output side planetary gears 24 is adjusted by the screwing operation of the adjusting nut 19a afterward. Accordingly, in the second embodiment, too, an ideal meshing state for meshing each gear substantially without backlash can be securely realized.

In the second embodiment, since the screwing operation of the adjusting bolt 33 can be done from outside of the gear housing 20, all the backlash adjustments can be done after completion of assemblage of the lower shaft 11b born by the ball bearing 19. Furthermore, for example, even when the backlash changes due to abrasion at the meshing portion of each gear, the maintenance would be easier since the backlash can be re-adjusted by the operations of the adjusting bolt 33 and the adjusting nut 19a from outside of the gear housing 20 without disassembling the apparatus.

Figure 4:
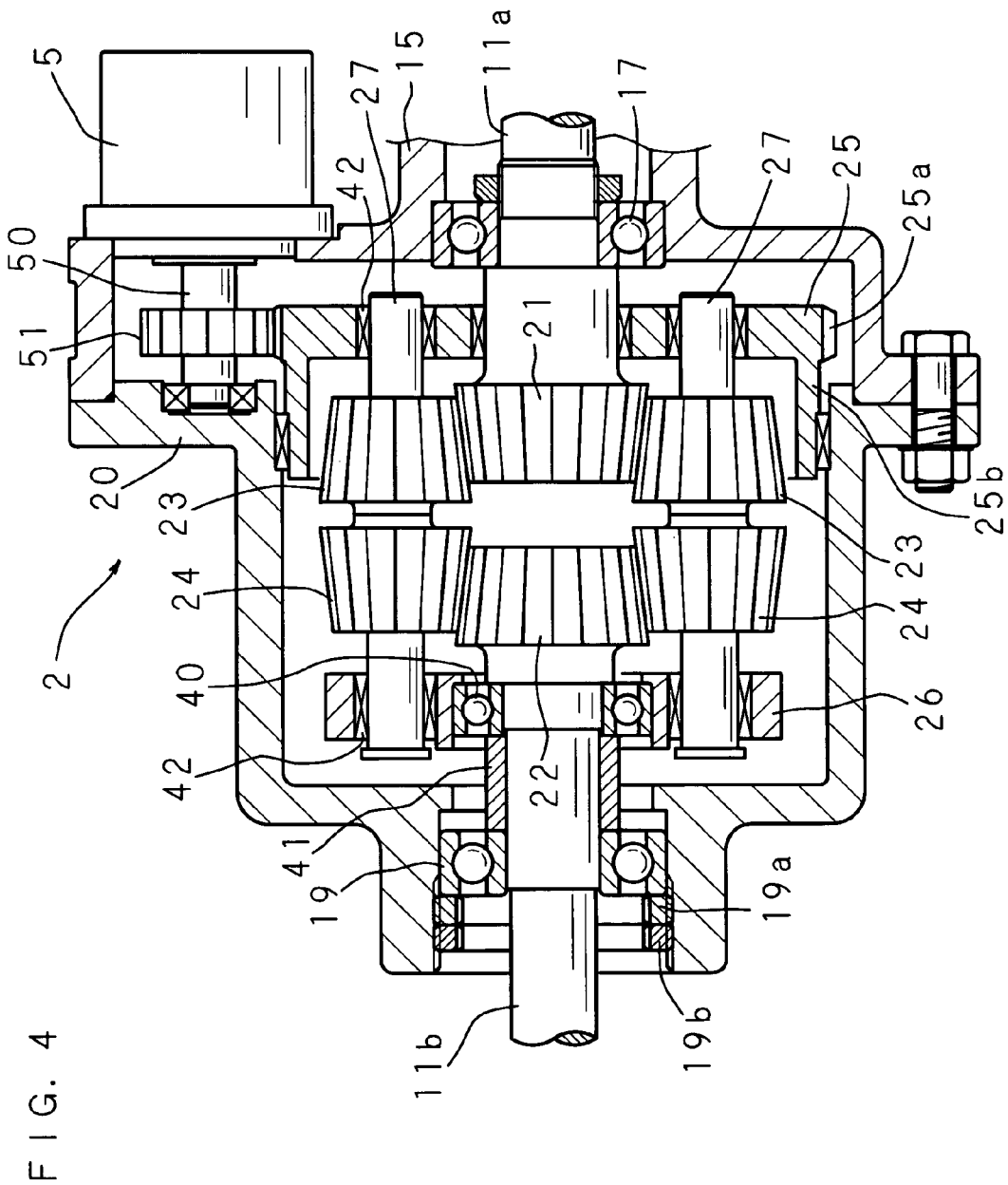
FIG. 4 is a longitudinal sectional view showing a third embodiment of a planetary gear apparatus according to the present invention.

FIG. 4 is a longitudinal sectional view showing a third embodiment of a planetary gear apparatus 2 according to the present invention. The third embodiment shown in FIG. 4 presents a similar structure as the first embodiment shown in FIG. 2 except for the support structure of the second carrier plate 26 and the bearing structure of each spindle 27 to the second carrier plate 26 as described later. Accordingly, in FIG. 4, the component members corresponding to the first embodiment are provided with the same reference numerals as in FIG. 2 and the description is omitted.

In the planetary gear apparatus 2 shown in FIG. 4, the second carrier plate 26 is born to a lower shaft 11b prohibiting a downward relative movement by a ball bearing 40 capable of thrust-loading fitted to the lower shaft 11b. Both end faces of a cylindrical collar 41 fitted to the lower shaft 11b are respectively abutted against the lower side end face of inner ring of the ball bearing 40 and the upper side end face of inner ring of a ball bearing 19 for bearing the lower shaft 11b on the gear housing 20. Accordingly, the ball bearing 40 and the second carrier plate 26 born by the ball bearing 40 can move upward (right in FIG. 4) integrally with the lower shaft 11b born by the ball bearing 19, and the output sun gear 22.

On the other hand, each spindle 27 of each integrated pair of the input side planetary gear 23 and the output side planetary gear 24 is born to a second carrier plate 26 via a bearing 42, for example, a needle roller bearing, a slide bearing, etc. enabling a movement in the axial length direction. Accordingly, each integrated pair of the input side planetary gear 23 and the output side planetary gear 24 can move in the axial length direction with respect to the second carrier plate 26.

In the planetary gear apparatus 2 constructed in such a manner, the output sun gear 22 moves closer to the input sun gear 21 by upward moving the ball bearing 19 bearing the lower shaft 11a by the screwing operation of the adjusting nut 19a. At the same time, the ball bearing 40 is pushed upward via the collar 41, and the second carrier plate 26 born by the ball bearing 40 also moves upward. At that time, each integrated pair of the input side planetary gear 23 and the output side planetary gear 24, which are born on the second carrier plate 26 can move to an appropriate position between the output sun gear 22 and the input sun gear 21 by a relative movement of each spindle 27 with respect to the second carrier plate 26. Accordingly, the backlash between each of the output side planetary gears 24 and the output sun gear 22, and that between each of the input side planetary gears 23 and the input sun gear 21 are collectively adjusted by the upward movement of the output sun gear 22 as described above. The backlash adjusted in such a manner is maintained by clamping of the lock nut 19b from the lower side of the adjusting nut 19a.

As described above, in the planetary gear apparatus 2 shown in FIG. 4, the backlash between all the gears can be collectively adjusted by the screwing operation of the adjusting nut 19a. Accordingly, in the third embodiment, too, an ideal meshing state for meshing each gear substantially without backlash can be securely realized, and the backlash adjustment during assembling can be easily done. Since the screwing operation of the adjusting nut 19a can be done from outside of the housing 20, for example, re-adjustment for eliminating a change in backlash caused by the elapsing abrasion of each gear can be done without disassembling the apparatus, and the maintenance would be easier.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. A planetary gear apparatus comprising:
an input sun gear and an output sun gear supported coaxially;
a plurality of integrated pairs of an input side planetary gear meshing with an outer periphery of said input sun gear and an output side planetary gear meshing with an outer periphery of said output sun gear;
a carrier supporting a plurality of spindles commonly and pivotably supporting each integrated pair of said input side planetary gear and said output side planetary gears;
a first adjusting device for adjusting a backlash between said input side planetary gear and said input sun gear, or a backlash between each of said output side planetary gears and said output sun gear by pressing said carrier from one side in the axial length direction to another side and moving each of said input side planetary gears or each of said output side planetary gears; and
a second adjusting device for adjusting a backlash between said output sun gear and each of said output side planetary gears, or a backlash between said input sun gear and each of said input side planetary gears by pressing said output sun gear or said input sun gear from one side in the axial length direction to another side and moving it, wherien
the planetary gear apparatus transfers rotation of said input sun gear to said output sun gear while changing gear ratio in stepless manner by rotating said carrier in both forward and reverse directions, and
continuously shifted gears which change an amount of addendum modification continuously in the axial length direction are used as said input sun gear, said output sun gear, each of said input side planetary gears and each of said output side planetary gears.

2. The planetary gear apparatus as set forth in claim 1, wherein said first adjusting device is provided so as to be operated from outside of a housing for supporting said input sun gear and said output sun gear.

3. A planetary gear apparatus comprising:
an input sun gear and an output sun gear supported coaxially;
a plurality of integrated pairs of an input side planetary gear meshing with an outer periphery of said input sun gear and an output side planetary gear meshing with an outer periphery of said output sun gear;
a carrier supporting a plurality of spindles commonly and pivotably supporting each integrated pair of said input side planetary gear and said output side planetary gear; and
a backlash adjusting device for collectively adjusting a backlash between said output sun gear and each of said output side planetary gears and that between said input sun gear and each of said input side planetary gears by pressing said output sun gear in the axial length direction and moving it closely to said input sun gear, or by pressing said input sun gear in the axial length direction and moving it closely to said output sun gear, wherein
the planetary gear apparatus transfers rotation of said input sun gear to said output sun gear while changing gear ratio in stepless manner by rotating said carrier in both forward and reverse directions,
continuously shifted gears which change an amount of addendum modification continuously in the axial length direction are used as said input sun gear, said output sun gear, each of said input side planetary gears and each of said output side planetary gears, and
each of said integrated pairs of said input side planetary gears and said output side planetary gears is supported to said carrier in a manner permitting an integral movement in the axial length directions.

4. A steering apparatus comprising:
a planetary gear apparatus including an input sun gear and an output sun gear supported coaxially, a plurality of integrated pairs of an input side planetary gear meshing with an outer periphery of said input sun gear and an output side planetary gear meshing with an outer periphery of said output sun gear, and a carrier supporting a plurality of spindles commonly and pivotably supporting each integrated pair of said input side planetary gear and said output side planetary gear, the planetary gear transferring rotation of said input sun gear to said output sun gear while changing gear ratio in stepless manner by rotating said carrier in both forward and reverse directions;
an adjusting member for adjusting a backlash between said input side planetary gear and said input sun gear by pressing a ball bearing supporting a support cylinder coaxially projected onto one side of a steering shaft, moving the supporting cylinder from one side in an axial length direction to another side, and moving the output side planetary gears to the another side via a ball bearing for the supporting shaft pressed in accordance with the movement of the supporting cylinder, the movement of the input sun gears being regulated to another side; and
a regulating member for regulating correlative rotation of the adjusting member, wherein
continuously shifted gears which change an amount of addendum modification continuously in the axial length direction are used as said input sun gear, said output sun gear,
each of said input side planetary gears and each of said output side planetary gears.

5. The steering apparatus as set forth in claim 4, further comprising:
an adjusting member for adjusting a backlash between the output sun gears and the output side planetary gears by moving the output sun gears from one side in an axial length direction to another side via the ball bearing supporting a journal provided to the middle of the steering shaft; and
a protection member for protecting the adjustment member.

* * * * *